June 21, 1932. G. M. MERWIN 1,864,312
SAFETY DEVICE FOR CORN SHREDDERS
Filed Oct. 12, 1927 6 Sheets-Sheet 4
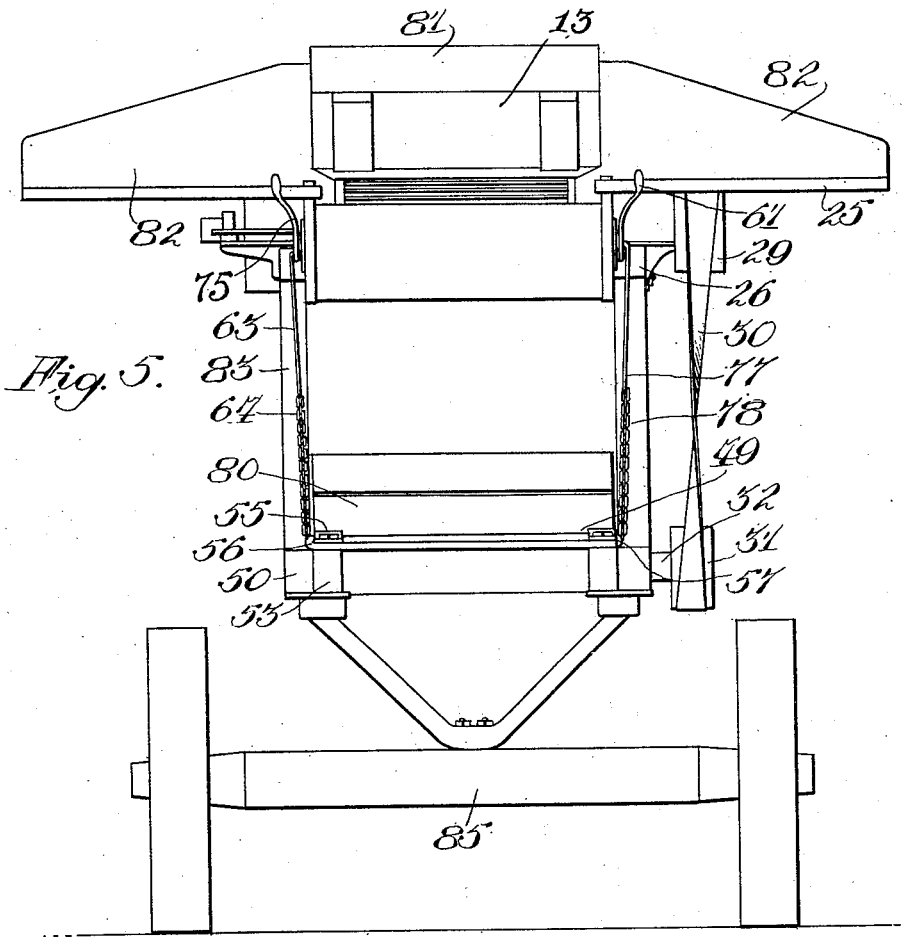
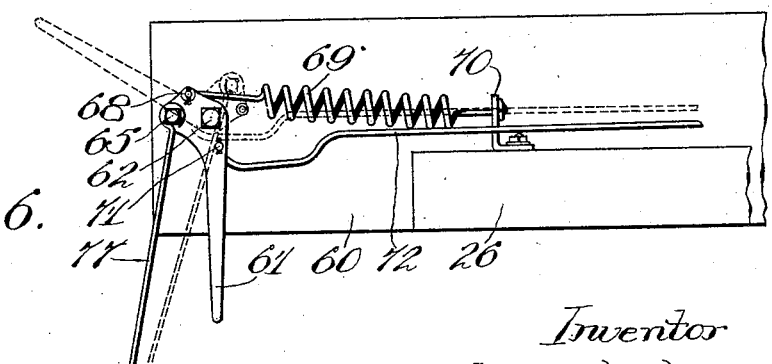
Inventor
George M. Merwin
By H. P. Doolittle
Atty.

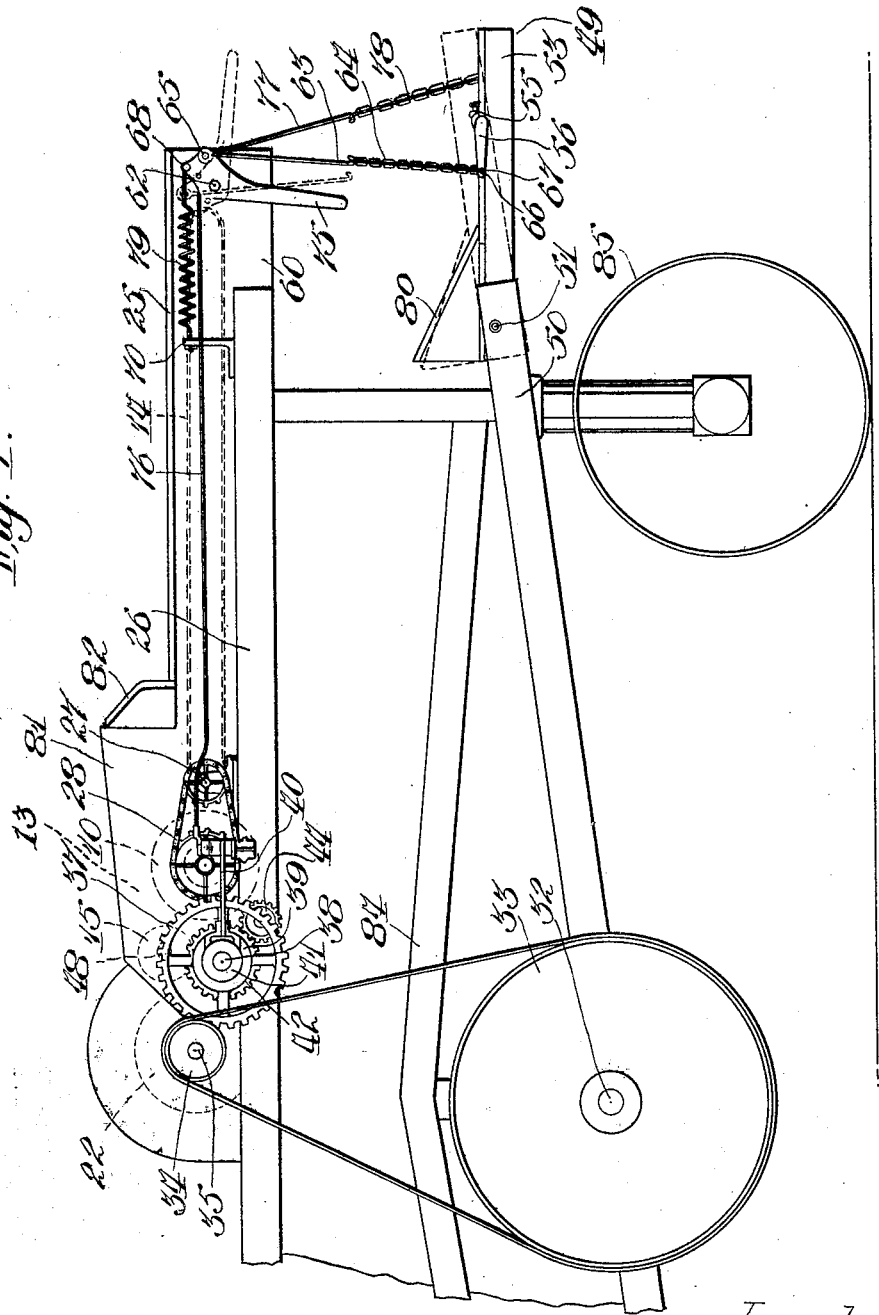

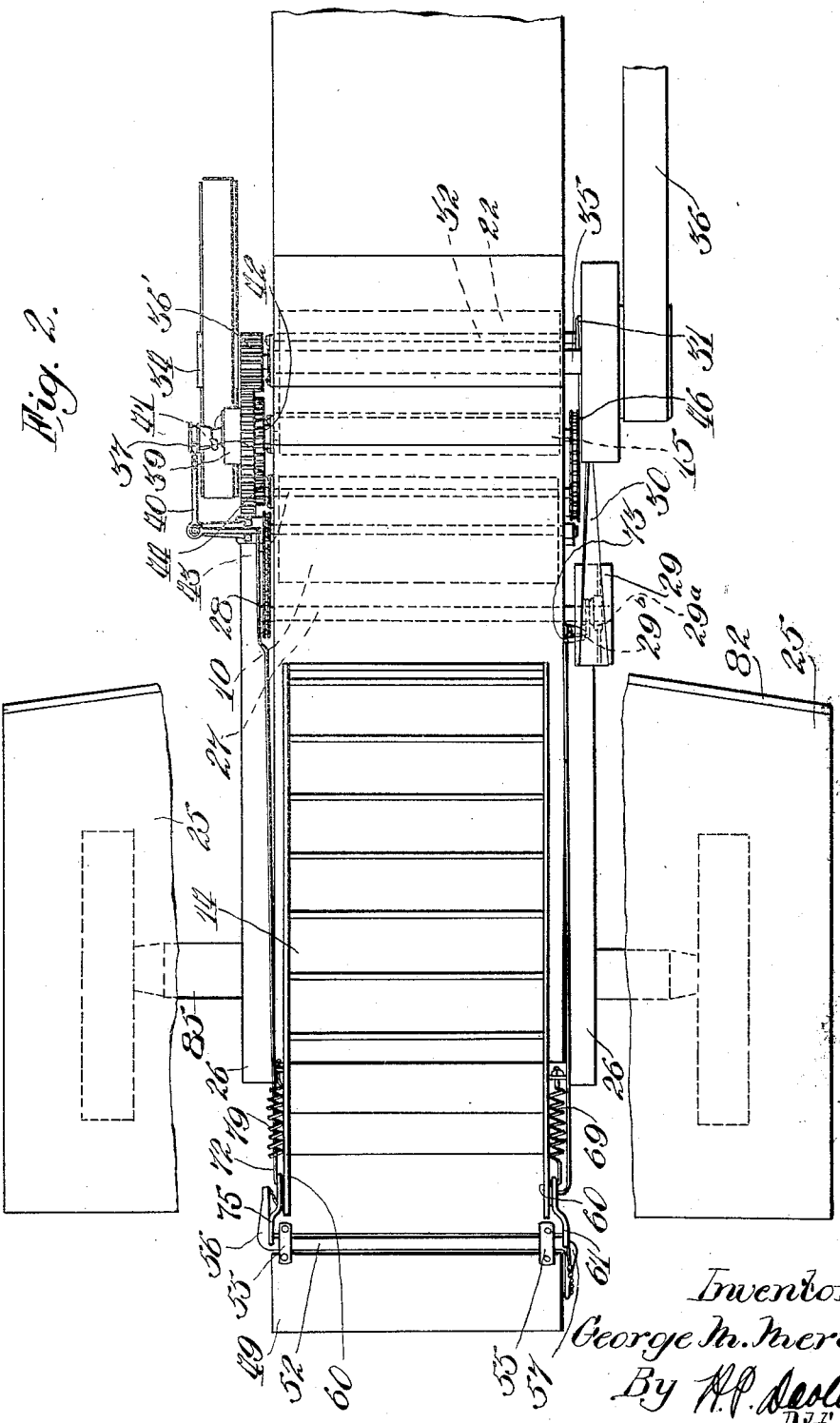

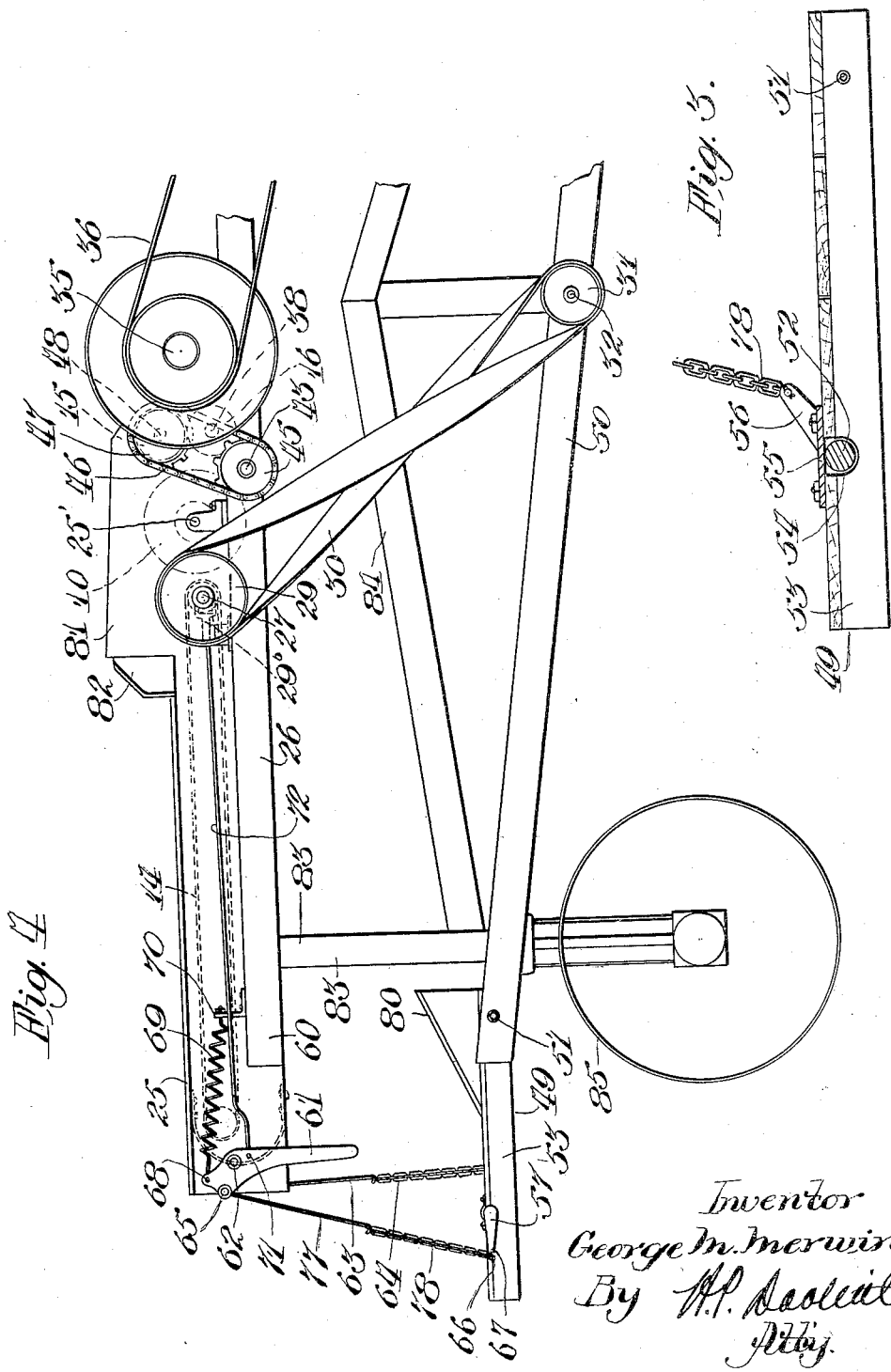

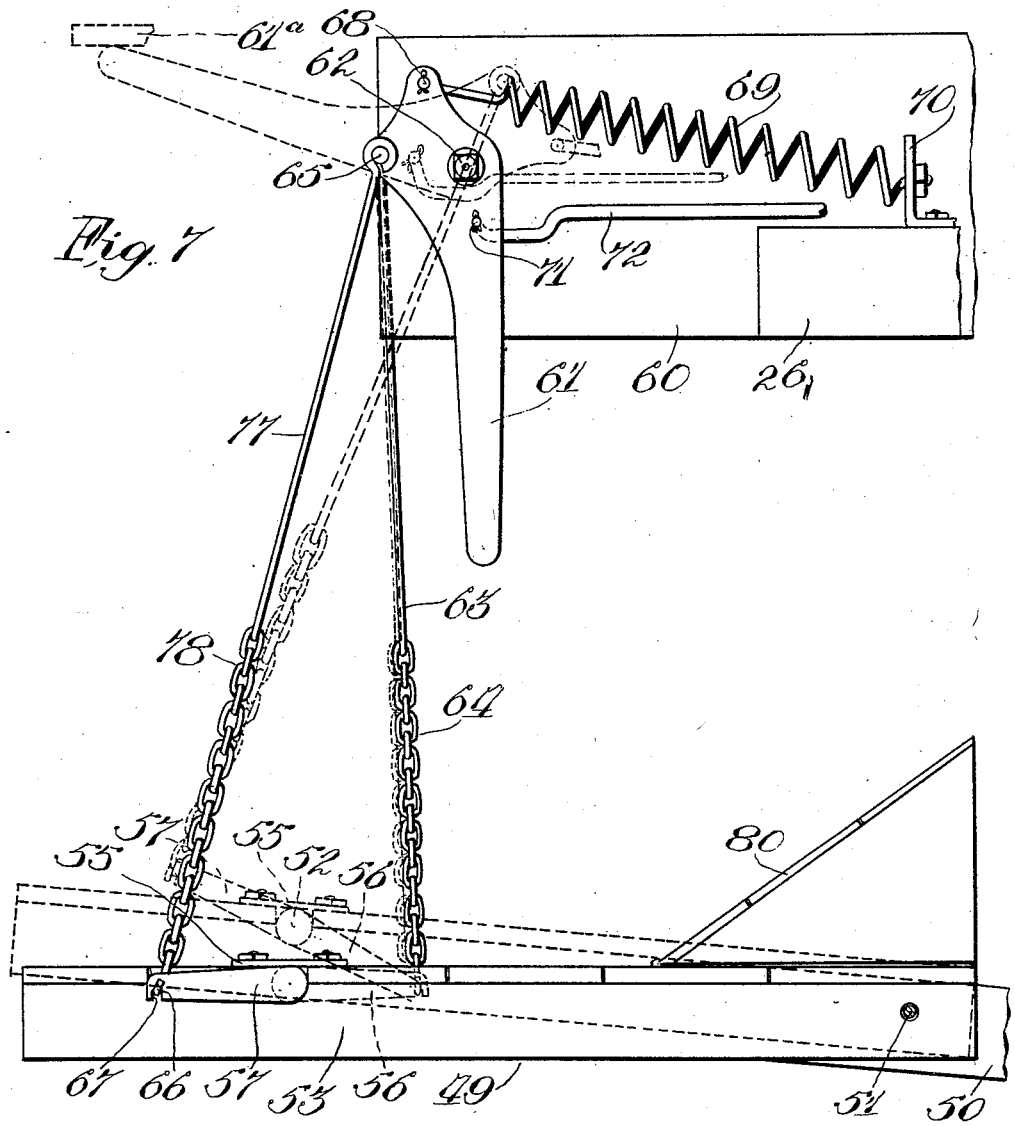

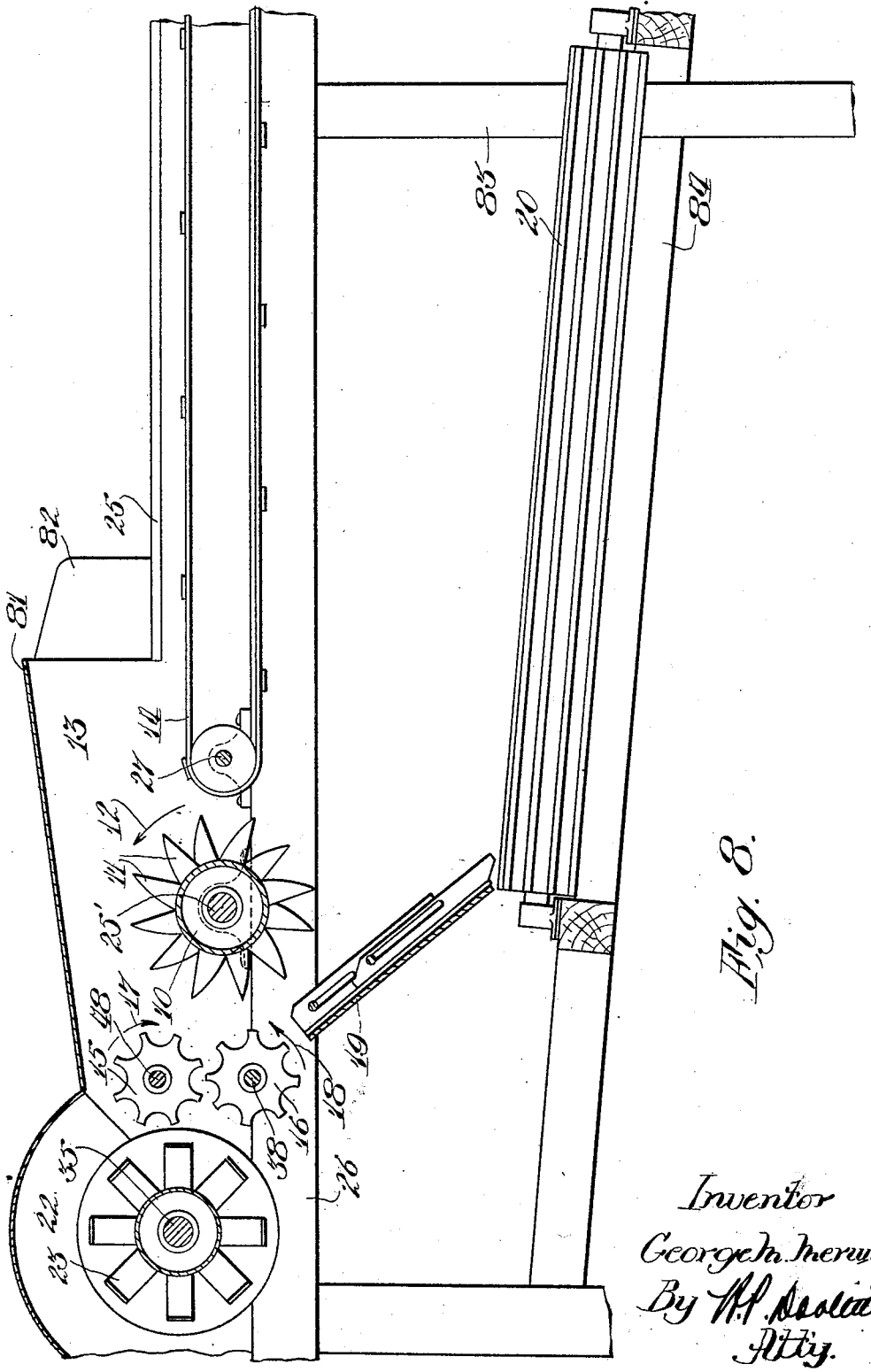

Patented June 21, 1932

1,864,312

UNITED STATES PATENT OFFICE

GEORGE M. MERWIN, OF BERWYN, ILLINOIS, ASSIGNOR TO INTERNATIONAL HARVESTER COMPANY, A CORPORATION OF NEW JERSEY

SAFETY DEVICE FOR CORN SHREDDERS

Application filed October 12, 1927. Serial No. 225,631.

This invention relates to controllers for power operated machines and more particularly to safety devices for agricultural machines.

The invention is illustrated as an improvement in a corn husker and shredder. These machines employ powerfully driven steel of iron snapping rolls which are rotated in opposite directions to forcibly grip and pull corn stalks between them. The stalks are entirely pulled through between the rolls and the ears of corn are snapped off to drop in front of the rolls. It often happens that the throat of the machine leading to the snapping rolls becomes objectionably filled with weeds and trash, which are gathered with the corn in the field. In such event the operator of the machine leaves his station on a movable platform in front of the snapping rolls and reaches down into the throat of the machine to clear the trash. Because of the fact that the corn stalks are being forcibly pulled through the rolls when this happens, many serious acidents have occurred by reason of the fact that some part of the operator's body was drawn between the snapping rolls by the moving stalks. A purpose of the present invention is to provide a safety device which will instantly stop the operation of the snapping rolls when the operator or attendant leaves his station for any purpose.

In the illustrative husker and shredder a feeder is employed for presenting the stalks to the snapping rolls. In this instance the feeder comprises an endless conveyor and a rotary device which may be termed a feeder head or a cutter. It is an object of the invention to provide control mechanism for instantly stopping the operation of the feeder when the operator leaves his station.

It is also an object of the invention to provide a control mechanism as above outlined, which shall be capable of operation at the will of the attendant while he is at his station on the machine, this capability of the machine in no way interfering with the automatic operation of the safety device as it is above outlined.

Another object of the invention is to provide control mechanism which will permit the operator to stop the operation of the feeder of the snapping rolls without interfering with the operation of the parts of the device which automatically stop the movement of the other of said mechanisms when the operator leaves his station.

A further object of the invention is to provide a safety device which makes it necessary for the operator to positively operate control devices for the feeder and for the snapping rolls before their operation begins. In other words, the operation of those devices will not begin when the operator assumes his station on the platform at the front of the machine. He must release one locking device for the feeder and another for the snapping rolls before their operation starts. When he has released those locking devices, his weight upon the platform holds those devices in such condition that the feeder and the snapping rolls continue to operate until he leaves the platform, when their operation will be instantly interrupted.

It is also an object of the invention to construct the above mentioned control mechanism in such a way that it may be applied to huskers and shredders without interfering with the conventional platform arrangement and without causing the tilting of the platform to either side during any operation of the control mechanism. Such platforms are usually arranged so that they may be elevated to an inoperative position wherein the decrease of the over-all length of the machine facilitates transport. The illustrative control mechanism may be installed without interfering with this feature.

Other objects of the invention will appear as the following description proceeds.

The illustrative embodiment of the invention is shown in the accompanying drawings in which,—

Figure 1 is a side elevation of the left side of the machine illustrating the control mechanism for automatically throwing the snapping rolls out of operation;

Figure 2 is a plan view of the illustrative machine showing the arrangement of the various parts of the control mechanism;

Figure 3 is a detail sectional view illustrating the manner in which the controller of crank shaft is related to the platform;

Figure 4 is a side elevation of the side of the machine opposite the side illustrated in Figure 1, showing the control mechanism for automatically discontinuing the operation of the conveyer and the cutter or feeder head;

Figure 5 is a front elevation of the machine showing the manner in which parts of the control mechanism are arranged with reference to the platform and the bundle conveyer;

Figure 6 is a detail view showing the two positions of a platform lift lever, the dotted line position showing the arrangement of the parts when the platform is locked in elevated position;

Figure 7 is a side elevation showing the arrangement of various parts of the control mechanism when the platform is in its different positions, the controller or crank shaft and the platform being shown in elevated position in dotted lines; and Figure 8 is a diagrammatic view in the nature of a vertical section showing the arrangement of the operative elements of the machine.

Referring to Figure 8 of the drawings, the illustrative machine includes a cutter or feeder head 10 having radially projecting knives 11. This cutter or feeder head rotates in the direction of the arrow 12 and acts to cut the bands on bundles fed into the passageway 13 by the conveyer 14 and to assist in the moving of the stalks into proper contact with the snapping rolls 15 and 16. These snapping rolls rotate in the direction of the arrows 17 and 18 so as to pull the corn stalks through between them. The ears of corn snapped from the stalks by these rollers are guided by the chute 19 to husking mechanism 20. This husking mechanism is of any preferred type and is not, therefore, described in detail in this application. The husked ears of corn fall from the lower end of the husking mechanism to any suitable collection or delivery means.

The stalks passing between the snapping rolls 15 and 16 are forcibly fed to a shredder head 22 carrying cutting elements 23. The shredder head is rotated at high speed so as to cut and thoroughly comminute the stalks. The shredded or comminuted fodder leaving the shredder head is delivered to any desired position by any preferred delivery means forming no part of the present invention.

Figure 8 also discloses the relationship of the bundle platform 25 to the conveyer 14. There are two of these platforms located at a level slightly above the level of the conveyer and at either side thereof so that the attendant may easily push the bundles of stalks along the platforms onto the conveyer.

Considering the machine as above described, it is readily seen that serious injury is liable to be caused to any attendant who is drawn into the passageway 13 by the conveyer. He is liable to be badly cut by the rapidly moving knives 11 and, if any part of his clothing or body gets between the snapping rolls, he will be drawn therebetween and crushed. The control mechanism described in the following paragraphs prevents any such occurrence.

*The conveyer and cutter drive*

The cutter or feeder head 10 is fixed upon a shaft 25' journaled on the frame members 26. This shaft is driven from the conveyer shaft 27 through the agency of sprocket gearing 28 connecting the two shafts at one side of the machine. The conveyer shaft 27 has a pulley 29 thereon at the other side of the machine. A clutch 29ª moved by a lever 29ᵇ causes the pulley 29 to be operably connected to or disconnected from shaft 27. This pulley is driven by a belt 30 trained around a second pulley 31 fixed upon a jack shaft 32 at one side of the machine. The other end of the jack shaft is rotated by a third pulley 33 belted to a fourth pulley 34 on the shredder shaft 35. The latter receives its rotation through a belt 36 driven by any suitable source of power. Tracing the cutter drive from its source, it then involves the elements 36, 35, 34, 33, 32, 31, 30, 29, 27 and 28 in the order named.

*The snapping roll drive*

The snapping roll drive begins with the spur pinion 36' fixed upon the shredder head shaft 35 inside the pulley 34. This pinion drives and meshes with a gear 37 rotatably mounted on the lower snapping roll shaft 38. This gear may be clutched to the shaft 38 so as to rotate therewith by means of a clutch 39 controllable at the will of the attendant by means of a bell crank shipper lever 40, a sliding cone 41, and connections hereinafter described. The shaft 38 also carries a spur gear 42 arranged to be driven by the gear 37. It is to be noted that the snapping roll 15 is rotated in a direction opposite to that of the roll 16. The driving connections for accomplishing this include a jack shaft 43 journaled transversely of the frame and preferably located below the snapping roll shaft 38. At one end this jack shaft carries a spur gear 44 meshing with and driven by the gear 42. At its other end a sprocket wheel 45 is connected by a sprocket chain 46 with a sprocket wheel 47 fixed upon the upper snapping roll shaft 48.

*The control mechanism*

As illustrated in Figure 1 of the drawings, the machine is provided with an attendant's platform 49 pivotally connected to the frame members 50 on a horizontal axis indicated at 51. The platform 49 is so positioned that the machine attendant is directly in front of the conveyer 14 and substantially between the bundle platforms 25 when he is standing on it.

For purposes which will be hereinafter referred to the platform is equipped with an equalizer or controller herein shown as a crank shaft 52 journaled transversely of the platform, as clearly indicated in Figures 2, 3 and 7 of the drawings. In Figure 3, the platform sills 53 are shown provided with notches 54 for receiving the crank shaft. Retainers 55 secured to the platform keep the crank shaft in operative position on the platform. Oppositely extending cranks 56 and 57 of the crank shaft 52 are preferably so located beyond the respective sides of the platform that the latter will not interfere with their movement. The crank shaft with its cranks 56 and 57 constitute parts of connections between the respective clutch levers 29$^b$ and 40 and the platform for correlating the operation of the machine and the movements of the platform. The remaining parts of these connections are described below.

The connections which enable the attendant to voluntarily control the cutter and conveyer operation, and which also automatically control that operation according to platform conditions are on the right hand side of the machine, looking from a position in front of the machine. They are shown in full lines in Figure 7 of the drawings. In this figure one of the upper beams of the machine is indicated at 60. Pivotally secured to the side of this beam is a control element shown as a self-locking platform lift lever 61. The fulcrum of this lever is shown at 62 preferably formed by a bolt extending through the beam.

A platform support including the link 63 and the chain 64 is pivotally secured to the lever 61 by pivot 65. The chain is secured to the crank arm 57 by seating a link or a hook 66 in the notch 67 of that arm. At another position on the lever 61, a pivot pin 68 secures one end of a retractile spring 69 to the lever. The other end of this spring is secured to a bracket 70 fixed upon the body of the machine. The spring is shown in its tensioned condition in Figure 7, it being regarded that the platform 49 is supporting the operator so as to hold the lever 61 in its full line position and the spring in the condition shown.

At still another position on the lever 61 a pivot pin 71 connects a link 72 to the lever. This link extends along the side of the machine rearwardly to the clutch shipper lever 29$^b$ to which it is pivotally connected at 73. By means of the connections described above, the conveyer and the cutter are stopped by the disengagement of the clutch 29$^a$ when the spring 69 pulls the lever 61 to its dotted line position shown in Figure 7. This action elevates the platform 49 to the position shown in dotted lines and so moves the pivot pin 65 that the platform supports 63 and 64 depend from a position moved past dead center relative to the axis above which the lever 61 pivots. It will be evident that this action will automatically lock the platform against downward movement with the lever 61 inasmuch as the spring is strong enough to prevent the lever from moving clockwise beyond its dotted line position. However, if desired, a stop 61$^a$ may be provided for further insuring no clockwise movement of the lever 61 beyond its dotted line position. The attendant may stand on the platform when the lever 61 is in its dotted line position, but the platform will not move down. The conveyer and cutter will not begin to operate until the lever is positively moved from its dotted line position to its full line position.

Because of the above described locking action of the lever 61 without the interposition of any manually releasable latch or like element, it is thought that this element may be properly termed a "lock lever", or a "self-locking lever". Besides having the automatic action above described, it is evident from the disclosure that the lever 61 is susceptible of manual operation by the attendant while he is standing on the platform. This capability of the machine is important when material is being fed to the snapping rolls 15 and 16 at a faster rate than they can take care of it. In that case the attendant should interrupt the operation of the conveyer long enough to allow the snapping rolls to clear the throat of the machine of the accumulation of material.

Directly opposite the lever 61 and on the opposite side of the machine, is a lock lever 75 shown as substantially similar in structure and operation to the lever 61. This second lever is connected to the lever 40 for acting on the clutch 39 to control the operation of the snapping rollers 15 and 16. The link 76 extending along the side of the machine affords this connection which is related to the lever 75 in the same manner as the link 72 is related to lever 61. A platform support including the link 77 and the chain 78 connects the lever 75 to the crank arm 56 in a manner similar to that in which the other platform support connects lever 61 and crank arm 57. A spring 79 acts upon the lever 75 in much the same manner as the spring 69 acts upon lever 61. It tends to constantly pull lever 75 to the dotted line position illustrated in Figure 1 of the drawings. In this position the connection 77 has moved past the fulcrum of the lever 75 so as to lock the platform against downward movement with connection 77 until the lever 75 is manually moved downwardly enough to release it from its dead center locking position and move the connection 77 forwardly of the fulcrum of lever 75.

*The operation of the described controlling mechanism*

Let it be assumed that the illustrative machine is set up and is connected to a source of power, the belt 36 being in operation and driving the shaft 35 at high speed. The operator has not yet mounted to his position on the platform 49. Under these conditions, the platform 49 is in its highest position, a position at greater elevation than its dotted line position shown in Figure 7 of the drawings. Both levers 61 and 75 are in their upper positions, thereby acting as dead center locks to prevent downward movement of the platform, and acting to hold the conveyer 14, the cutter or feeder head 10, and the snapping rolls 15 and 16 inoperative. The attendant or operator then stands on platform 49, but none of the above parts are thereby put into operation. He must move one of the levers 61 or 75 to its unlocking position before any action of those parts takes place. This is due to the dead center locking arrangement of the parts, as shown in dotted lines in Figure 7.

Bundles of corn stalks are thrown on the platforms 24 and the attendant is ready to begin operations. Before placing any stalks on the conveyer 14, the feeder head and the snapping rolls are connected to their driving mechanisms. If the operator desires to throw all of the devices into operation at once he graps both levers 61 and 75 and forces them downwardly. They are held in their down positions by the weight of the operator on the platform 49 and both clutches 29ª and 39 are held in engaged or operative condition. Then the conveyer 14, the feeder head 10, and the snapping rolls 15 and 16 are operating; stalks placed on the conveyer are fed to the feeder head; the cutter or feeder head cuts the bands on the bundles of stalks and feeds them to the snapping rolls; and, the snapping rolls separate the ears from the stalks and feed the latter to the shredder head 22.

If, on the other hand, the operator wishes to throw the parts into operation successively, he may do so. By first depressing the lever 75, the snapping rolls 15 and 16 are separately thrown into action. Afterward, the lever 61 may be depressed to begin the operation of the conveyer and the feeder head. Either set of these devices may be separately thrown out of action by the operator while he stands on the platform. If, for instance, when the machine parts are all running, the operator notices that the conveyer and feeder head are presenting stalks to the snapping rolls faster than they can be well taken care of by the latter, he raises lever 61, thus stopping the feeding of the conveyer and feeder head until the throat of the machine in front of the snapping rollers is cleared. While the lever 61 is up and the lever 75 is in its lower position, the parts are in the condition indicated in dotted lines in Figure 7 of the drawings. As the lever 61 was raised, the platform 49 moved from its full line position to its dotted line position and the crank shaft or equalizer 52 oscillated to the extent indicated by the angular change of the crank arms 56 and 57 from their full line positions to their dotted line positions. During this movement, the platform is tilted only a small angle due to the action of the equalizer and, while the parts are positioned as indicated in Figure 7, the conveyor and feeder head are locked out of operation and the snapping rolls are held in operation by the weight of the operator on the platform 49.

If, while all the machine parts are in operation, the operator wishes to stop only the movement of the snapping rolls, he raises lever 75. This action raises the platform to the same extent indicated in Figure 7, but the positions of the crank arms 56 and 57 are reversed, the outer end of the former being elevated by the platform support 78. The platform is again kept substantially level by the crank shaft, or equalizer, and the platform is locked in the elevated position by the dead center locking action of lever 75 and its associated parts.

If, while all operative parts of the machine are in motion, the attendant or operator is by any circumstance drawn along the conveyor 14 with the moving stalks, both levers 61 and 75 instantly snap to their upper and clutch disengaging positions and all movement of the conveyer, feeder head, and snapping rolls immediately stops. Even though the snapping rolls are stopped when such an event happens, the lever 61 will instantly snap to clutch disengaging position so as to cause the conveyer and the feeder head to cease movement.

From the above description it will be seen that the invention presents a safety device which makes it impossible for the attendant to be drawn into the mechanism of a corn husker and shredder so as to cause serious injury. It also presents an improved shredder controlling means permitting the operator of the shredder to desirably control all of the operative parts of the machine without impairing the operation of the automatic safety device. If the operator desires to run the conveyer and stop the shredder head, he may manipulate the controls to do this, and, if he wishes to stop the conveyer while running the shredder head, he may also accomplish that result, all while he is standing on the platform. The applicant believes that he is the first to provide a mechanism such as that shown for attaining these results.

Among the parts of the illustrative machine not above described are the guard 80, the hood 81, the stalk guides 82, the frame uprights 83, beams 84, and front truck 85. These parts are auxiliary to the above described mechanism and it is believed that their construction and operation will be clear without further description.

Obviously the present invention is not limited to the specific details of construction, arrangement, and mode of operation shown in the drawings, since the same may be variously modified to suit different conditions or requirements. Moreover, it is not indispensable that all of the features of the invention be used conjointly, since they may be advantageously used in various different combinations and sub-combinations.

What is claimed as new is:

1. A machine of the class described comprising, in combination, a cutter, a cutter drive, a movable platform for supporting an attendant, a clutch in the cutter drive, connections between the clutch and the platform including a member movable past dead center to automatically lock the platform in elevated position when the member is moved to one position, and means constantly tending to move the member past dead center.

2. A machine of the class described comprising, in combination, a cutter, a cutter drive, a movable platform for supporting an attendant, a clutch in the cutter drive, connections between the clutch and the platform including a platform lifting hand lever movable past dead center to automatically lock the platform in elevated position when the platform lifting hand lever is moved to one position, and means constantly tending to move the platform lifting hand lever past dead center.

3. A machine of the class described comprising, in combination, a cutter, a cutter drive, a movable platform for supporting an attendant, a clutch in the cutter drive, connections between the clutch and the platform including a dead center locking lever acting to automatically lock the platform in elevated position when the lever is moved to one position, and means acting on the lever to elevate the platform when the attendant leaves it.

4. A machine of the class described comprising, in combination, a cutter, a cutter drive, a movable platform for supporting an attendant, a clutch in the cutter drive, connections between the clutch and the platform including a dead center locking lever acting to automatically lock the platform in elevated position when the lever is moved to one position, means acting on the lever to elevate the platform when the attendant leaves it, said lever being also manually operable, and a crank shaft secured to the platform and to the locking lever acting to tilt the platform a small angle when the locking lever is manually operated.

5. A machine of the class described, comprising, in combination, a feeder, a feeder drive, a movable platform for supporting an attendant, a clutch in the feeder drive, connections between the clutch and the platform including a member movable past dead center to automatically stop the operation of the feeder and lock the platform in elevated position when the member is moved to one position, and means constantly tending to move the member past dead center and so acting immediately when the platform is relieved of the weight of the attendant.

6. A machine of the class described comprising, in combination, a cutter, a cutter drive, a movable platform for supporting an attendant, a clutch in the cutter drive, connections between the clutch and the platform including a platform lifting hand lever movable past dead center to automatically lock the platform in elevated position when the platform lifting hand lever is moved to one position, and means constantly tending to move the platform lifting hand lever past dead center and so acting instantly when the platform is relieved of the weight of the attendant.

7. A machine of the class described comprising, in combination, a cutter, a cutter drive, a pivoted platform for supporting an attendant, a clutch in the cutter drive, connections between the clutch and the platform including a manually operable dead center locking lever acting to automatically lock the platform in elevated position and to disengage the clutch when the lever is moved to one position, means acting on the lever to elevate the platform when the attendant leaves it, and a crank shaft rotatably mounted on the platform to keep the platform substantially level when it is elevated.

8. A machine of the class described comprising, in combination, a cutter, a cutter drive, a movable platform for supporting an attendant, a clutch in the cutter drive, connections between the clutch and the platform including a manually operable dead center locking lever acting to automatically lock the platform in elevated position and simultaneously render the clutch inoperative when the lever is moved to its upper position, means acting on the lever to elevate the platform when the attendant leaves it, a crank shaft rotatably mounted on the platform to keep it substantially level when it is elevated, and flexible connections between the lever and the crank shaft.

9. A corn shredding machine comprising a frame, and a plurality of driven mechanisms thereon, an attendant's platform pivotally mounted on the frame, a dead center lock member mounted on the frame, a clutch controlling the drive to one of said mechanisms, a shifter for controlling the clutch, means connecting the lock member and the shifter, a controller journaled on the platform, a flexible depending platform support connecting the controller and the lock member in such a manner that the latter is automatically locked against movement by the platform when the lock member is in clutch disengaging position, a spring for constantly urging the lock member to clutch disengaging position a clutch controlling the drive of another of said mechanisms, a shifter for controlling this clutch, a second dead center lock member mounted on the frame, means connecting the second lock member and the shifter for said clutch, a second depending platform support connecting the second lock member and the controller, and a spring constantly urging the second lock member to clutch disengaging position wherein it is locked against movement therefrom by the platform.

10. A corn shredding machine comprising, in combination, a frame, a plurality of driven mechanisms on opposite sides thereof, a vertically movable platform for an attendant, a crank shaft extending transversely of the platform and journaled therein with a crank arm at either end, a platform supporting dead center lock lever pivoted at one side of the frame, a platform supporting link so connecting the lock lever with the crank arm on one end of the crank shaft that when the lever is in one position it is prevented from operation by the platform by a dead center lock, a clutch included in the driven mechanisms at each side of the frame, a clutch shipper lever, a platform supporting link connecting the clutch shipper lever and the dead center lock lever, means constantly urging the dead center lock lever to its position wherein it is locked against movement by the platform, and connections between the other crank arm and the other clutch similar to the above mentioned connections.

11. A fodder comminuting machine comprising, in combination, a rotary cutter, a conveyer for feeding fodder to the cutter, a platform for supporting an attendant, a conveyer and cutter drive, and connections between the platform and the drive to elevate the platform and lock it in elevated position and to automatically render the drive inoperative when the attendant leaves the platform, said connections including a hand lever operable by the attendant while on the platform to lift the latter and lock it in elevated position.

12. A machine of the class described comprising, in combination, stalk feeding mechanism, a drive for said mechanism, a movable platform for supporting an attendant, a clutch in the drive, and clutch actuating connections between the clutch and the platform including a self locking platform lifting lever acting to disconnect the clutch and lock the platform in elevated position when the platform lifting lever is moved to one position.

13. A machine of the class described comprising, in combination, a stalk feeding mechanism, a drive for said mechanism, a movable platform for supporting an attendant, a clutch in the drive, connections between the clutch and the platform including a self locking platform lifting lever acting to automatically lock the platform in elevated position when the platform lifting lever is moved to one position, and means constantly acting upon the lever to move it past dead center and to simultaneously move the platform to elevated position and to render the clutch inoperative immediately when the platform is relieved of the weight of the operator.

14. A machine of the class described comprising, in combination, snapping rolls, a drive for the snapping rolls, a movable platform for supporting an attendant, a clutch in the drive, clutch actuating connections between the clutch and the platform including a member automatically movable past dead center to lock the platform in elevated position and release the clutch when the member is moved to one position, and means constantly tending to move the member past dead center.

15. A machine of the class described having driving mechanism including a clutch, in combination with a safety device comprising an attendant's platform movable downwardly under weight, clutch throw out connections between the platform and clutch, said connections including a spring pulled, self locking member operable to throw out the clutch and disconnect the driving mechanism when the attendant leaves the platform.

16. A machine of the class described having driving mechanism including a clutch, in combination with a safety device comprising an attendant's platform movable downwardly under weight, a shaft on the platform, the shaft having a crank end, clutch throw out connections between the crank end and said clutch connections, and a spring pulled, over dead center self lock lever included in said connections and operable by action of the spring to throw out the clutch and disconnect the driving mechanism when the attendant leaves the platform.

17. A machine of the class described having a plurality of separate mechanisms driven independently from separate driving mechanisms each of which includes a clutch in combination with a safety control device comprising an attendant's platform movable downwardly under weight, clutch throw out connections between the platform and each clutch, each of said connections including a spring pulled, self locking member to throw out the clutches and stop the separate mechanisms when the attendant leaves the platform, and equalizer means for the connections to enable the attendant to unlock a locking member by hand to cause one of the separate mechanisms to resume operation.

In testimony whereof I affix my signature.

GEORGE M. MERWIN.